United States Patent [19]

Schallmeier et al.

[11] Patent Number: 4,698,245
[45] Date of Patent: Oct. 6, 1987

[54] UNVULCANIZED TREAD STRIP FOR PNEUMATIC VEHICLE TIRES

[75] Inventors: Günter Schallmeier, Neustadt; Gerhard de Vries, Garbsen, both of Fed. Rep. of Germany

[73] Assignee: Continental Gummi-Werke Aktiengesellschaft, Hanover, Fed. Rep. of Germany

[21] Appl. No.: 882,213

[22] Filed: Jul. 3, 1986

Related U.S. Application Data

[63] Continuation of Ser. No. 761,602, Aug. 1, 1985, abandoned.

[30] Foreign Application Priority Data

Aug. 1, 1984 [DE] Fed. Rep. of Germany ....... 3428368

[51] Int. Cl.$^4$ ........................... B32B 3/02; B32B 3/30
[52] U.S. Cl. .................................. 428/33; 152/209 R; 428/163; 428/172; 428/493; 428/212
[58] Field of Search ................. 428/33, 161, 163, 167, 428/172, 493, 212; 152/209 R, 209 NT, 209 D, 209 WT; 156/96

[56] References Cited

U.S. PATENT DOCUMENTS

| 2,317,963 | 4/1943 | Bashore | 428/163 |
| 2,386,502 | 10/1945 | Peik | 428/33 |
| 3,537,500 | 11/1970 | Beneze | 152/357 A |
| 3,814,160 | 6/1974 | Greasey | 156/209 R |
| 3,904,459 | 9/1975 | Schelkmann | 156/96 |
| 3,970,493 | 7/1976 | Grawey | 156/96 |
| 4,381,810 | 5/1983 | Cady et al. | 152/209 R |
| 4,603,721 | 8/1986 | Kogure et al. | 152/209 R |

Primary Examiner—Paul J. Thibodeau
Attorney, Agent, or Firm—Becker & Becker

[57] ABSTRACT

An unvulcanized tread strip for a pneumatic vehicle tire. The tread strip includes two or more superimposed layers. In order to improve the adhesion of these layers, adjacent layers of the tread strip are provided with a plurality of projections and corresponding recesses which positively intermesh with one another.

2 Claims, 1 Drawing Figure

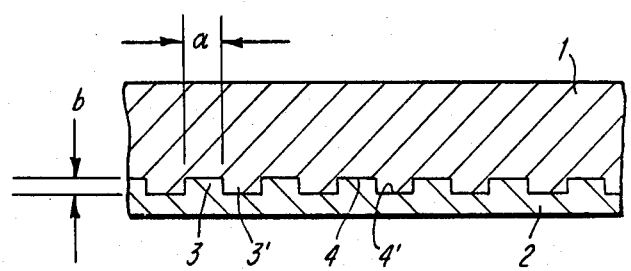

UNVULCANIZED TREAD STRIP FOR PNEUMATIC VEHICLE TIRES

This application is a continuation of co-pending parent application Ser. No. 761,602—Schallmeier et al filed Aug. 1, 1985, belonging to the assignee of the present invention and now abandoned.

BACKGROUND OF THE INVENTION

1. Field of the Invention

The present invention relates to an unvulcanized tread strip, for a pneumatic vehicle tire, having two or more layers which are superimposed, i.e. are disposed one upon the other. In other words, the present invention relates to a so-called untreated or raw, unvulcanized tread strip, which can be used for the manufacture of new tires, or can be used to retread or recap worn tires.

2. Description of Prior Art

Multi-layer tread strips were necessary in order to achieve a longer life than was possible with single-layer tread strips. However, the different rubber mixtures used for this purpose often have the drawback that they do not have the necessary adhesion relative to one another.

An object of the present invention is to provide a tread strip which overcomes this drawback.

BRIEF DESCRIPTION OF THE DRAWING

This object, and other objects and advantages of the present invention, will appear more clearly from the following specification in conjunction with the accompanying drawing, which is a schematic cross section of one embodiment of the present invention, and shows an untreated or still unvulcanized tread strip for the manufacture of a new pneumatic vehicle tire.

SUMMARY OF THE INVENTION

In order to preclude the separations which are associated with inadequate adhesion, and accordingly to correct bonding weaknesses, the tread strip of the present invention is characterized primarily in that adjacent layers of the tread strip are provided with a plurality of projections and corresponding recesses which positively intermesh with one another.

Tread strips are known where a positive connection is provided between superimposed layers of the tread strip. However, this positive connection is brought about by the flowing of the rubber within the vulcanization mold, and therefore cannot be precisely determined in advance. In contrast, the present invention relates to still unvulcanized tread strips, to which already in this still unvulcanized state, i.e. prior to the molding thereof in the vulcanization mold, a positive connection already is imparted thereto. This positive connection improves the adhesion therewith in the still unvulcanized state, and accordingly overcomes adhesion weaknesses.

DESCRIPTION OF PREFERRED EMBODIMENTS

Referring now to the drawing in detail, that layer of the tread strip which during use of the tire would be disposed toward the outside, and hence would be the upper layer which is smooth and uninterrupted, is designated with the reference numeral 1; the inwardly directed rubber layer is designated with the reference numeral 2.

The thickness of the layer 2 is generally considerably less than the thickness of the layer 1, which later in the vulcanized state, i.e. when the tire is completed, is the layer which is subjected to wear. The two layers differ from one another in their chemical and/or physical properties, as is the case with known so-called "cap and base" tread strip designs.

The positive connection of the two layers 1 and 2 is achieved by having the projections 3, 3' of a given one of the layers intermesh in corresponding recesses or grooves 4, 4' of the other layer already in the unvulcanized state; the projections 3, 3' have an essentially rectangular cross-section. In the illustrated embodiment, the inner layer 2 is provided with alternating projections 3 and recesses 4', while the outer layer 1 is provided with alternating projections 3' and recesses 4. Thus, in forming the positive connection between the two layers still in the unvulcanized state, the projections 3 of the inner layer 2 intermesh with the recesses 4 of the upper layer 1, and the projections 3' of the layer 1 intermesh with the recesses 4' of the layer 2. Also to be understood is that these projections 3, 3' and recesses or grooves 4, 4' can be embodied either as individual projections or teeth and recesses, or as ribs and grooves which extend in the longitudinal direction of the tread strip. The width "a" of the projections and of the recesses should be in the range of approximately 0.5 mm to 3 mm, while the associated depth "b" should be in the range of approximately from 0.5 mm to 2.5 mm.

Untreated or in other words still unvulcanized tread strips constructed in this manner are extruded in a common process and are mechanically compressed. During subsequent vulcanization, a bonding together is effected, whereby quite possibly at several locations the positive connections, i.e. the planes determined hereby, are distorted.

The present invention is, of course, in no way restricted to specific disclosure of the specification and drawing, but also encompasses any modifications within the scope of the appended claims.

What we claim is:

1. In a still unvulcanized tread strip, for a pneumatic vehicle tire, having at least two layers to be bonded which are disposed one upon the other in unvulcanized state this still having a plastic behavior including an outer surface of the outer layer which is smooth;

the improvement comprising adjacent ones of said layers respectively being provided with different rubbery mixtures still in an unvulcanized state, said layers thus differing from one another in chemical and physical properties thereof in the still unvulcanized state and the layer to be subjected to wear in the tread strip when subsequently vulcanized being considerably thicker than the adjacent layer in a tread strip uninterrupted from side to side; and a plurality of corresponding projections and recessed portions in the respective layers which positively intermesh in the still unvulcanized state so as to impart a positive connection thereto and with that receiving a considerable enlargement of bonding surface interengagement which improves adhesion therewith in the still unvulcanized state and accordingly overcomes adhesion weaknesses so that during subsequent vulcanization there is effected a bonding together less susceptible to subsequent separation therebetween;

said projections and said recessed portions having a width in a range of from about 0.5 to 3 mm, said projections and said recessed portions having a depth in a range of from about 0.5 to 2.5 mm; and said projections being in the form of ribs, said recessed portions being in the form of grooves, said ribs and grooves extending in the longitudinal direction of said tread strip; said projections being in the form of individual projections having an essentially rectangular cross-section, and said recessed portions being in the form of corresponding recesses that intermesh complementary to each other to preclude any separations which are associated with inadequate adhesion.

2. A tread strip according to claim 1, in which a first of said adjacent layers is provided with alternating projections and recessed portions, and a second of said adjacent layers is provided with corresponding alternating recessed portions and projections which superimposed positively intermesh complementary with said alternating projections and recessed portions of said first layer.

* * * * *